United States Patent [19]

Akegi

[11] Patent Number: 4,708,016
[45] Date of Patent: Nov. 24, 1987

[54] METHOD FOR MEASURING VOLUME AND APPARATUS THEREFOR

[75] Inventor: Seiji Akegi, Ube, Japan

[73] Assignee: UBE Industries, Ltd., Yamaguchi, Japan

[21] Appl. No.: 923,393

[22] Filed: Oct. 23, 1986

[51] Int. Cl.⁴ .............................................. G01F 17/00
[52] U.S. Cl. ...................................................... 73/149
[58] Field of Search ................. 73/149, 865, 433, 437, 73/32 R; 177/50

[56] References Cited

U.S. PATENT DOCUMENTS 1,594,546  8/1926  Mojonnier ........................... 73/433

FOREIGN PATENT DOCUMENTS 2524140  9/1983  France ................................. 73/149
0020814  2/1984  Japan .................................. 73/149
0402785  3/1974  U.S.S.R. .............................. 73/149
0569898  8/1977  U.S.S.R. .............................. 73/32 R
1096501  6/1984  U.S.S.R. .............................. 73/149

Primary Examiner—Stewart J. Levy
Assistant Examiner—Robert R. Raevis
Attorney, Agent, or Firm—Frishauf, Holtz, Goodman & Woodward

[57] ABSTRACT

A method for measuring the volume of a sample comprises measuring the weight of the sample by means of a balance within a sealed vessel containing a first gas; then replacing the first gas in the vessel with a second gas having a density different from that of the first gas; and then measuring the weight of the sample by means of the balance within the sealed vessel containing the second gas to determine a change of weight of the sample corresponding to the change of the gas in the sealed vessel. Then the volume of the sample is calculated according to Archimedis' principle as a function of the value of the difference between the density of the first gas and the second gas, and the value of the change of weight of the sample corresponding to the change of the gas. An apparatus for measuring the volume of the sample is also disclosed.

6 Claims, 2 Drawing Figures

METHOD FOR MEASURING VOLUME AND APPARATUS THEREFOR

BACKGROUND OF THE INVENTION

1. Field of the Invention

This invention relates to a method for measuring volume and an apparatus employable for the measurement.

2. Description of Prior Arts

Various methods of measurement with instruments have been developed with respect to the unification of international units in recent years. Various convenient instruments for the measurement of standard length, mass, time, etc. have been developed and put on the market. However, instruments for the measurement of volume is backward in the improvement thereof.

Known methods for measuring volume include the following JIS (Japanese Industrial Standard) definitions:

JIS R 3505: chemical volumenometer made of glass
JIS K 0061: method for measuring specific gravity of chemical products;
JIS Z 8804: method for measuring specific gravity of liquid;
JIS Z 8807: method for measuring specific gravity of solid;
JIS M 8716: method for measuring apparent specific gravity and porosity of iron ores (pellet);
JIS M 8717: method for measuring true specific gravity of iron ores;
JIS R 5201: physical testing method of cement
JIS A 1109: method for measuring specific gravity of fine aggregate and testing water absorption thereof; and
JIS A 1110: method for measuring specific gravity of coarse aggregate and testing water absorption thereof.

Further, a method and an apparatus for measuring the volume of known samples is disclosed in Japanese Patent Provisional Publication No. 51(1976)-67158, etc.

Each of these methods has certain advantages and is generally used in each specific field. However, they have disadvantages in that (1) those enabling quick measurements are low in accuracy; (2) those enabling measurements with high accuracy are complicated and require much time; (3) one method is hardly used for various purposes (for example, samples must be limited to any of liquid, solid and powder); (4) there must be used liquids which do not dissolve samples; and (5) pressure must be applied so that samples for the measurement are limited.

Accordingly, it is highly demanded to invent a method for measuring volume, said method being applicable to various purposes, when a sample has substantially constant volume in the air, and also to invent an apparatus for measuring the volume of said sample.

SUMMARY OF THE INVENTION

The present inventor has made studies to meet the demand and found that the volume of a sample can be directly measured utilizing a combination of a modern gas density balance or a gas specific gravity balance having excellent properties in wide use, quickness and accuracy, and a solid balance.

As long-established methods for measuring specific gravity, there have been various methods utilizing Archimedes' principle. This principle is currently applied to the methods for measuring density and specific gravity and is used in the JIS standard. The principle is that a sample is suspended in a liquid and the density of the sample is determined from its apparent mass in the liquid and the mass in the air, that is, the density is determined by deducting the volume of the sample from the buoyancy of the sample in the liquid and the density of the liquid. The methods utilizing the principle are widely used as those which are very accurate.

However, in the above methods, the sample must be immersed in a liquid and hence, the sample must be solid. Accordingly, these methods have disadvantages in that there must be used a liquid which does not dissolve the sample, the density of the liquid must be previously determined by an additional method, and hence, these methods are in some cases not employable or quick measurement is hardly made.

The present invention is based on the application of Archimedes' principle that when a sample is immersed in a liquid, the buoyant force of liquid's mass equal to the volume of the sample in the liquid is applied thereto. The inventor has found that the volume of a sample can be determined, when the measurement of mass is made in a combination of "in the air—in a gas" in place of the above-described combination of "in the air—in a liquid" in a method using Archimedes' principle and at the same time, the density of the gas is determined.

There is provided by the present invention a method for measuring volume, which comprises:

causing gas density within a sealed vessel containing a balance to be changed;

measuring (A) the mass or weight of a sample to be measured within the sealed vessel, (B) the rate of change in the mass or weight of said sample and (C) the rate of change in gas density; and determining the volume of said sample from the measured values.

In the method of the present invention, basically the apparent mass of a sample is measured using a solid balance and conventional method. Subsequently, the density of a gas within a sealed vessel containing a gas density balance or a gas specific gravity balance and a solid balance is changed and the rate $\Delta G$ of change in the apparent mass of the sample is measured. At the same time, the volume $V_M$ of the sample is determined from the rate $\Delta \rho$ of change in the gas density. Namely, the following equation is given from Archimedes' principle and the volume can be measured.

$$V_M = (\Delta G / \Delta \rho) \qquad (1)$$

Since the present invention relates to a method for measuring volume by measuring mass or weight (both are hereinafter referred to simply as apparent mass) in the air using a mass or weight-measuring balance (hereinafter referred to as solid balance), it relates further to a method for determining the true mass (hereinafter referred to as mass) of said sample under vacuum and the true density or specific gravity (hereinafter referred to as density) of said sample under vacuum, while measuring the volume.

DETAILED DESCRIPTION OF THE INVENTION

The present invention provides a method for measuring volume, wherein a gas density balance or a gas specific gravity balance is used for the measurement of gas density and there are used one or more gases which are non-reactive with the sample to be measured, and an apparatus for measuring volume, which comprises a sealed vessel containing a balance wherein said balance is a gas density balance or a gas specific gravity balance for measuring gas density and a balance for measuring the mass or the weight of the sample to be measured.

Equation for volume calculation

Though the principle of the present invention can be represented by the equation (1), solid balance is practically affected by the volume of weight or beam and the equation (1) as such can not be applied to the measurement of volume. Accordingly, theoretical calculation equations for the cases of (1) equi-beam balance, (2) lever balance and (3) automatic balance according to the present invention will be described below by referring to FIGS. 1 and 2 showing the embodiments of the present invention.

1. Equi-beam balance

Figure 1:
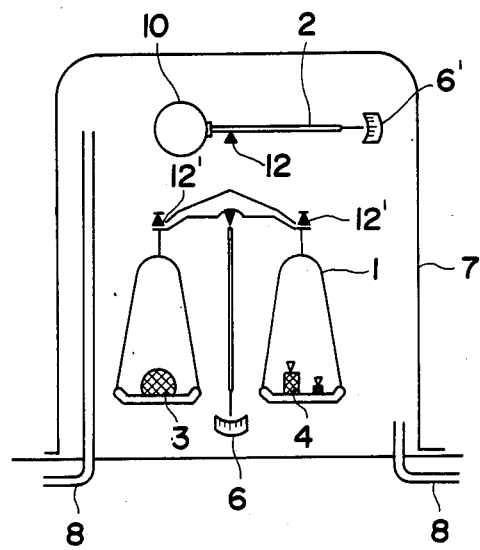
FIG. 1 shows diagrammatically an apparatus employable for performing the measuring method of the present invention wherein an equi-beam balance and a gas density balance or a gas specific gravity balance are used.
Figure 2:
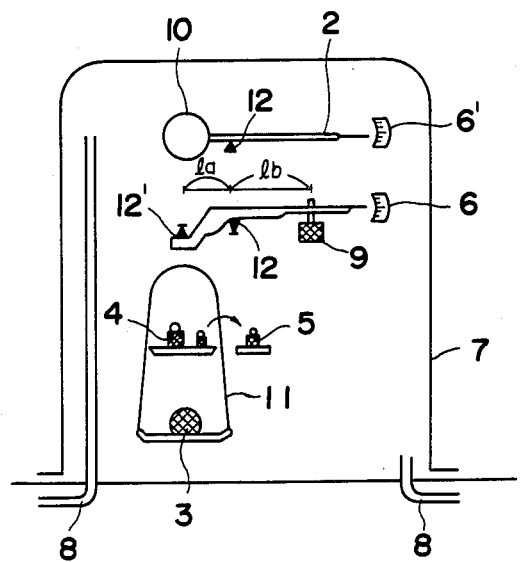
FIG. 2 shows diagrammatically another apparatus employable for performing the measuring method of the invention wherein a lever balance (un-equi-ratio beam balance) and a gas density balance or a gas specific gravity balance are used.

FIG. 1 shows diagrammatically one embodiment of the measuring apparatus of the invention wherein an equi-beam balance 1 and a gas density balance or a gas specific gravity balance 2 (for instance, Lux or Taylor gas balance) are seen.

The mass of a sample 3 to be measured, is referred to as M, the apparent mass (in the air, mass or weight affected by buoyancy, that is, weighed value) thereof is referred to as Ma and the volume thereof is referred to as $V_M$. Further, the mass of a weight 4 is referred to as G, and the apparent mass and the volume thereof are referred to as Ga and $V_G$, respectively.

In the equi-beam balance 1, the right and left beams thereof are equal in length and hence, both sides are symmetrical with respect to volume and weight. Thus the effect of buoyancy can be eliminated. Accordingly when the sample 3 and the weight 4 are balanced, the following equation is given.

$$Ma = Ga \tag{2}$$

From Archimedes' principle, the apparent mass is equal to a value obtained by deducting buoyancy from the mass.

$$Ma = M - \rho V_M \tag{3}$$

$$Ga = G - \rho V_G \tag{4}$$

From the equations 2 to 4, there is obtained $$M = G + \rho(V_M + V_G) \tag{5}$$

In the present invention, apparent weighing value (reading of weight) $G_1$ and the volume $V_{G1}$ of the weight at a gas density $\rho_1$ within the sealed vessel are read. Subsequently, the gas density is changed from $\rho_1$ to $\rho_2$, and $G_2$ and $V_{G2}$ are read. Thus, the following equations are obtained from the equation (5).

$$M = G_1 + \rho_1(V_M - V_{G1}) \tag{6}$$

$$M = G_2 + \rho_2(V_M - V_{G2}) \tag{7}$$

The equation (7) minus the equation (6) is $$V_M = \frac{G_2 - G_1}{\rho_1 - \rho_2} + \frac{V_{G1}\rho_1 - V_{G2}\rho_2}{\rho_1 - \rho_2} \tag{8}$$

The value $V_M$ is obtained from the equation (8).

In the improved method of the present invention, a measuring method which does not cause change in the volume of a measuring system (numeral 6 in FIG. 1) is used in the measurement of $(G_2 - G_1) = \Delta G$, that is, in the measurement of a difference (equal to a difference in buoyancy) in the reading values of the weight caused by changing the gas density within the vessel from $\rho_1$ to $\rho_2$. For example, when change in the position of rider weight, the angle of slope of beam, elastic force, electromagnetic force, electrostatic capacity, piezo-electric effect, etc. are taken into consideration, and there is used a method which does not cause change in the volume of the above measuring system, $V_{G1} = V_{G2}$ and hence, the following equation is obtained from the equation (8).

$$V_M = V_{G1} + \frac{\Delta G}{\rho_1 - \rho_2} \tag{9}$$

When there is allowed to be $\rho_1 - \rho_2 = \Delta \rho$, the following equation is obtained.

$$V_M = V_{G1} + \frac{\Delta G}{\Delta \rho} \tag{10}$$

The volume $V_M$ of the sample to be measured is determined from the volume $V_G$ of the weight, a difference $\Delta G$ in the reading of weighing value and a difference $\Delta \rho$ in the gas density using the equation (10). Hence, the method of the present invention is a practical one.

2. Lever balance

FIG. 2 shows diagrammatically another embodiment of the apparatus of the present invention wherein a lever balance (un-equi-ratio beam balance) 11 and a gas density balance and a gas specific gravity balance 2 are used. The mechanism of the lever balance is utilized in a direct reading balance, automatic balance and electronic balance. In the lever balance 11, the same reference symbols as in the equi-beam balance are used except that the symbol G represents the total mass applied to a fulcrum 12' on the side of a weighing disk. In addition, the mass of a balance weight 9 is referred to as W, and the apparent mass, the volume and the density thereof are referred to as Wa, $V_W$ and $\rho_W$, respectively. Further, distances from fulcrum to the center of gravity are referred as a la and lb.

Furthermore, the effects of the mass and volume of the beam caused by unequal ratio in the balancing of the lever balance are allowed to be constant and are neglected (practical correct method will be described hereinafter).

(a) the case where no sample is placed.

There is determined the rate $\Delta G_o$ of change in the reading of the solid balance caused by changing gas density within the vessel under such conditions that no sample is placed. The balance of the lever balance in the gas is:

$$Ga = (lb/la)Wa \tag{11}$$

$$\begin{cases} Ga = G - \rho V_G & (12) \\ Wa = W - \rho V_W & (13) \end{cases}$$

$$\therefore G = \rho V_G + \frac{lb}{la}(W - \rho V_W) \tag{14}$$

The density of the gas is changed from $\rho_1$ to $\rho_2$ according to the invention, and the change in apparent indicating value appearing in a micro-changing rate-measuring part 6 is referred to as $\Delta G_O$.

$$G = \rho_1 V_G + \frac{lb}{la}(W - \rho_1 V_W) \tag{15}$$

$$G = \rho_2 V_G + \frac{lb}{la}(W - \rho_2 V_W) + \Delta G_0 \tag{16}$$

Equation (16) minus equation (15) is:

$$\Delta G_0 = \left(V_G - \frac{lb}{la} V_W\right)(\rho_1 - \rho_2) \tag{17}$$

In the lever balance, the following equations are given.

$$\left(V_G - \frac{lb}{la} V_W\right) = \text{constant} = k \tag{18}$$

$$\therefore \Delta G_0 = k(\rho_1 - \rho_2) = k \cdot \Delta\rho \tag{19}$$

Namely, in the lever balance, there is produced $\Delta G_O$ proportional to a difference $\Delta\rho$ between $\rho_1$ and $\rho_2$, even when no sample is measured.

Depending on the volume of the beam, etc. in practice, k is somewhat changed by the values of $\rho_1$ and $\rho_2$. Accordingly, it is preferred that the lever balance of the present invention is an apparatus where $k \approx 0$, that is, $\Delta G_o \approx 0$.

As a practical correcting method for giving $\Delta G \approx 0$, that is for providing an apparatus where $k \approx 0$ in the equation (18), the correction is to be made so as to meet the following conditions.

$$k = V_G - \frac{lb}{la} V_W \approx 0 \tag{20}$$

$$V_G \approx \frac{lb}{la} V_W \tag{21}$$

$$\frac{G}{\rho_G} \approx \frac{lb}{la} \cdot \frac{W}{\rho_W} \tag{22}$$

The case where $\Delta G \approx 0$ can be obtained, when G, W, $\rho_G$ and $\rho_W$ are properly chosen by controlling the ratio of la/lb of the beam, the mass of the weight or the balancing weight and the apparent volume thereof (for instance, controlling apparent density with cavity weight) so as to meet the conditions of the equations (21) and (22).

(b) the case of where a sample is placed.

Generally, the measurement of mass with a lever balance is made in such a manner that a sample having a mass of M is placed on a weighing disk and balanced with W by removing a weight 5 ($G_R$) corresponding to the weight M from weight 4. Thus, change in volume is caused depending on M and $\rho_M$ every time.

When the balance in the air is taken into consideration, the lever balance is considered to be a substitution weighing method and hence, the following equations are given.

$$Ma = G_{Ra} \tag{23}$$

$$\begin{cases} Ma = M - \rho V_M & (24) \\ G_{Ra} = G_R - \rho V_{GR} & (25) \end{cases}$$

$$\therefore M = G_R + \rho(V_M - V_{GR}) \tag{26}$$

Namely, there can be given an equation which is in the same form as that of the equation (5) for the equibeam balance. In the above equations, $G_R$ is the read-out value of the weight 5 which is removed for balancing, and Ma and $G_{Ra}$ are apparent mass (value affected by buoyancy).

In the present invention, a difference $\Delta G_a$ between the apparent masses of the sample is determined by changing the gas density from $\rho_1$ to $\rho_2$. However, a difference $\Delta G_o$ is produced in the lever balance, even when the sample is not placed thereon. Hence when a difference corresponding to $\Delta G$ in the equation (10) is referred to as $\Delta g$, a difference $\Delta Ga$ between apparent masses appearing on scales 6' can be represented by the following equation.

$$\Delta Ga = \Delta G_o + \Delta g \tag{27}$$

When gas density is changed from $\rho_1$ to $\rho_2$, the following equations are obtained from the equation (26).

$$M = G_R + \rho_1(V_M - V_{GR}) \tag{28}$$

$$M = G_R + \rho_2(V_M - V_{GR}) + \Delta g \tag{29}$$

Equation (29) minus equation (28) is $$V_M = V_{GR} + (\Delta g/\Delta\rho) \tag{30}$$

wherein, $\Delta g = \Delta Ga - \Delta G_o = \Delta Ga - k \cdot \Delta\rho$

In the lever balance where $k \approx 0$, $\Delta G_o \approx 0$ and $\Delta g = \Delta Ga$ and hence, there is obtained an equation which is in the same form as that of the equation (10).

3. Automatic balance (automatic scale)

The term "automatic balance" used herein refers to all of solid balances for the measurement of mass or weight by utilizing the slope of beam, electromagnetic force, elastic force, piezo-effect, pressure, etc. without making the addition and exclusion of the weight. Namely, the term "automatic balance" refers to solid balances which do not cause change in volume in measuring system. Examples of such automatic balances include electronic balance, torsion balance, spring balance and piezo-balance.

In the above automatic balance (automatic scale), mass is measured and generally expressed as weight = mass (acceleration of gravity g = constant). It is considered that the balance is calibrated so as to indicate weight = mass, and the indicating value G is allowed to be mass. Accordingly, the following equations are obtained.

$$Ma = G \quad (31)$$
$$Ma = M - \rho V_M \quad (32)$$

$$\therefore M = G + \rho V_M \quad (33)$$

Since gas density is changed from $\rho_1$ to $\rho_2$ in the invention, the following equations are given.

$$M = G_1 + \rho_1 V_M \quad (34)$$
$$M = G_2 + \rho_2 V_M \quad (35)$$

Equation (35) minus equation (34) is $$(G_2 - G_1) = V_M(\rho_1 - \rho_2) \quad (36)$$

$$V_M = \frac{\Delta G}{\Delta \rho}$$

The above-described cases are listed in Table 1.

TABLE 1

| Type | Volume Calculation Equation | Remarks |
|---|---|---|
| Equi-beam balance | $V_M = V_G + \frac{\Delta G}{\Delta \rho}$ (10) | $\Delta G = G_2 - G_1$ |
| Lever balance | $V_M = V_{GR} + \frac{\Delta G}{\Delta \rho}$ (30) | $\Delta \rho = \rho_2 - \rho_1$ |
| Automatic balance | $V_M = \frac{\Delta G}{\Delta \rho}$ (36) | $\Delta g = \Delta G_a - \Delta G_0$ |

As seen from the calculation equation of Table 1, the main feature in the method of the present invention lies in the measurement of $\Delta G$ and $\Delta \rho$ and hence, it is necessary to use a solid balance having high detection sensitivity. Now, when a sample having a density of 1 to 2 g/cm$^2$ is used and significant figures in volume measurement are taken by a number of four figures, the following detection sensitivity in terms of the minimum detected amount/weighing (hereinafter referred to as accuracy ratio) are as follows:

(a) $10^{-6}$ to $10^{-7}$ (accuracy ratio: 0.1 mg/100 to 200 g) in the case where gas is a combination of air-carbon dioxide gas or air-helium;

(b) $10^{-5}$ to $10^{-6}$ (accuracy ratio: 1 mg/100 to 200 g) in the case where gas is a combination of air-SF gas; and (c) $10^{-5}$ to $10^{-6}$ (accuracy ratio: 1 mg/100 to 200 g) in the case where gas is a combination of one atmospheric pressure of air—10 atmospheric pressures of air.

Thus, the measurement can be easily made by a modern solid balance.

Method for measuring mass and density

Since volume can be measured from the volume calculation equation of Table 1 by using a solid balance, true mass can be determined from apparent mass simultaneously weighed.

The calculation equations for the method for measuring mass are as follows:

(1) Equi-beam balance
When equation (10) is introduced into equation (6), $$M = G_1 + \rho_1(\Delta G/\Delta \rho) \quad (37)$$

(2) Lever balance
When equation (30) is introduced into equation (28), $$M = G_{R1} + \rho_1(\Delta g/\Delta \rho) \quad (38)$$

(3) Automatic balance
When equation (36) is introduced into equation (34),
$$M = G_1 + \rho_1(\Delta G/\Delta \rho) \quad (39)$$

The mass M of a sample can be determined from the mass $G_1$ or $G_{R1}$ of a weight balanced with the sample, gas density $\rho_1$ at that time and a difference $(\Delta G/\Delta \rho)$ or $(\Delta g/\Delta \rho)$ in volume between the sample and the weight.

Since the volume $V_M$ and mass M of the sample can be determined according to the method of the present invention, the density $\rho_M$ (density under vacuum) of the sample can be determined from the following equation.

$$\rho M = (M/V_M) \quad (40)$$

Additional description for measurement (1) Method for changing gas density

As the method for changing gas density within the sealed vessel, there is most preferred a method wherein the type of gas is changed (a gas substitution method). This is because a sample causing change in volume can be measured by pressure change, since said method can be easiy conducted and pressure in the measuring system can be kept constant. This method makes it possible to measure the volume of gas (for instance, toy balloon or hollow glass sphere) in a container and further the mass and density thereof. Furthermore, an average molecular weight can be determined by measuring the pressure of the sample gas.

The type of such gas must be those which are not reacted with samples and do not cause adsorption phenomenon. A combination of gases having different densities is used. The greater the difference in density between gases, the combination thereof is more preferred. Further, there are preferred gases which can be easily used as liquefied gas. Examples of such gases include air, carbon dioxide gas, propane, butane, sulfur hexafluoride, hydrogen, inert gases of Group O of the Periodic Table such as helium, nitrogen, oxygen and fluorinated chorinated hydrocarbons. A combination of air-carbon dioxide gas is preferred from the viewpoints of safety and handling.

Further, as the method for changing gas density within the sealed vessel, there are methods wherein pressure or temperature is changed. Since these methods can be easily carried out, examples thereof are omitted.

(2) Alternative method for measuring gas density

While a method using a gas density balance (gas specific gravity balance) has been described as the method for measuring gas density, other methods may be used.

For instance, there is a method wherein a standard sample having known volume is used. In this method, the standard sample and a sample to be measured are weighed in parallel. In the calculation equation thereof, the volume of the standard sample is referred to as $V_{MS}$, the volume of a weight to be balanced therewith when weighed is referred to as $V_{GS}$ and the change in mass of the weight occurring when gas density is changed from $\rho_1$ to $\rho_2$, is referred as to $\Delta G_S$. The change of $\Delta \rho$ in gas density required for measuring the volume of the sample can be determined from the following equation which is a modification of the equation (10).

$$\Delta \rho = \frac{\Delta G_S}{V_{MS} - V_{GS}} \quad (41)$$

wherein, $V_{MS} \neq V_{GS}$ ($\rho_{MS} \neq \rho_{GS}$)

Similarly, the volume $V_{MS}$ and the mass $M_S$ in the measurement of the mass of a sample can be determined by using a known standard sample. Gas density $\rho_1$ for the measurement of the mass can be determined from the following equation.

$$\rho_1 = \frac{M_S - G_S}{V_{MS} - V_{GS}} \quad (42)$$

The standard sample may be a weight for solid balance. Preferably employed is a method wherein one or more weights having greatly different densities are used in the solid balance or a method wherein lever weight is used as a standard sample having known volume in the lever balance.

The standard sample is more preferred, the lower the density thereof. For instance, when a glass sphere having a volume of 200 ml and mass of 100 g is used as a standard sample, there are used a solid balance and a weight having a density of 8.0 g/cm$^3$, and gas density is changed by a gas substitution method using air-carbon dioxide system, $G_S$ of the equation (41) is 0.1153 g. Thus, $G_S$ can be determined with sufficient accuracy even by commercially available solid balance (25° C., 1 atm).

(3) other methods

Since the volume and the density of a sample generally vary depending on temperature and pressure, the solid balance must be kept at a constant temperature under constant pressure during weighing and hence, it is preferred to use additionally a temperature control device and a pressure control device. As a simple method therefor, there is a method wherein the weighing mechanism of the solid balance is housed in a metal block to reduce temperature change and unevenness in temperature. This method is a preferred one, because effects of external electromagnetic force, etc. can be reduced and when gases are replaced, the amount of the gases to be replaced are small and the replacement can be rapidly made.

The mechanism of conventional solid balance can be applied as such to the method and the apparatus of the present invention and the volume of samples can be measured. However, it is preferred to automate the method of the present invention by introducing servo mechanism, computer, etc. into the mechanism of the apparatus for weighing, gas substitution, reading, operation and display.

When the sample is a fluid such as a powder or a liquid, a sample container must be used. A container having known volume and mass is used and the volume and the mass of a sample are calculated by deducting the volume and the mass of the container. When the density of the solid balance is the same as that of the weight of the solid balance, $\Delta G$ is not affected by the volume of the sample container, an error in the measurement is reduced and the measurement can be made more quickly. Thus, such an operation is preferred.

The following examples wherein equi-beam balance or lever balance is used, are provided to illustrate the present invention. However, no example wherein automatic balance is used, is offered, because it is considered to be a matter which can be easily conceived from the following examples.

EXAMPLE 1

As the solid balance, an equi-beam balance (chemical balance type 1 manufactured by Shimazu Seisakusho Co., Ltd.) (weighing capacity: 200 g., reciprocal sensibility: 10 mg., minimum detecting amount: 0.1 mg.) and weights of 200 to 0.1 g. (density: 8.40 g/cm$^3$) were used. In order to replace gas within a sealed container, there was used an apparatus in which the solid balance together with a drying agent was placed in a polyethylene bag (numeral 7 of FIGS. 1 and 2). The change of gas density within the sealed vessel was conducted by changing the type of gas within the sealed vessel in such a manner that a sample to be measured was weighed in the atmosphere and carbon dioxide gas is then introduced through pipes 8 from the bottom of the polyethylene bag into the bag while the upper part of the bag was opened to the atmosphere to discharge air, thus replacing air with carbon dioxide gas.

In Example 1, pure magnesium block (size: about 55.1 mm×42.5 mm×38.4 mm cube, purity: 99.97%) was used as a sample (a). The volume of the sample (a) was measured.

The measurement of the rate $\Delta \rho$ of change in gas density was made by using a standard sample which was a hollow glass bottle (volume $V_{MS}$=115.75 cm$^3$, mass $M_S$=149.9955 g.) on which a stopper was put.

Operation for measurement

The operation measurement was made in the following manner. The level and the zero of the solid balance was adjusted, and the sample (a) and the standard sample were weighed in the atmosphere to determine apparent mass $G_1$ and $G_{S1}$.

Subsequently, the replacement of the gas within the sealed vessel was made. Namely, air within the vessel was replaced by carbon dioxide gas, and the sample and the standard sample were weighed to determine apparent mass $G_2$ and $G_{S2}$ in carbon dioxide gas.

The time required for the measuring operation was 8 minutes and the temperature within the sealed vessel was 25.2° C. at an atmospheric pressure of 755 mmHg.

The measured values were as follows:

Sample (a):
  $G_1$=156.1125 g.,
  $G_2$=156.0684 g.
Standard sample:
  $G_{S1}$=149.8809 g.
  $G_{S2}$=149.8202 g.

Zero shift due to carbon dioxide gas substitution was negligible.

Volume calculation

A difference $\Delta \rho$ in gas density was determined from the measured value of the standard sample by using the equation (41). The measured value less than 0.1 g. was determined not by weights, but by rider shift and the shifting rate of rest point (a method wherein the value is determined from amplitude). Accordingly, since change in the volume of the weight was not involved, the values of $V_G$ and $V_{GS}$ were calculated by using the read values of the weights of 0.1 g. or above.

$$\Delta\rho = \frac{149.8809 - 149.8202}{115.75 - 149.8/8.40}$$

$$= 0.00062 \text{ g/cm}^3$$

The volume $V_M$ of the sample (a) was calculated from the equation (10).

$$\therefore V_M = \frac{156.1}{8.40} + \frac{156.1125 - 156.0684}{0.00062}$$

$$= 89.71 \text{ cm}^3$$

Calculation of mass and density

Mass (mass under vacuum) M was determined from the equations (42) and (37), and density (density under vacuum) $\rho_M$ was determined from the equation (40).

$$\rho_1 = \frac{149.9955 - 149.8809}{115.75 - 149.8/8.40}$$

$$= 0.00117 \text{ g/cm}^3$$

$$\therefore M = 156.1125 + 0.00117 \times \frac{156.1125 - 156.0684}{0.00062}$$

$$= 156.1957 \text{ g.}$$

$$\therefore \rho_M = \frac{156.1957}{89.71} = 1.741 \text{ g/cm}^3$$

COMPARISON EXAMPLE 1

The sample (a) was used and volume $V_M$, mass M and density $\rho_M$ were determined by a method wherein weighing was conducted in water in accordance with JIS M 8807—1976 (Article 4 of solid specific gravity measuring method). In weighing the sample (a) in water, the sample was previously immersed in water, de-aeration under vacuum was conducted and the sample was then weighed after no bubble was formed. Time required for the measurement was 120 minutes.

Mass M was determined from apparent mass G in the atmosphere after making the correction of buoyancy (a method described in pp. 431-1985 of chronological table of Science).

The measured results of the sample (a) were as follows:
$V_M = 89.77$ cm$^3$,
M = 156.1968 g.,
$\rho_M = 1.740$ g/cm$^3$.

EXAMPLE 2

The procedure of Example 1 was repeated except that Toyoura standard sand was used as a sample (b). Since the sample (b) was a powder, an aluminium square dish (11×16.5×2.5 cm; volume: 6.49 cm$^3$, mass: 44.5124 g.) was used as a receiver. The sum of the sample (b) and the receiver was weighed and the value of the receiver was deducted therefrom. Time required for the measurement was 20 minutes.

The measure results were as follows:
$V_M = 55.65$ cm$^3$,
M = 146.9227 g.,
$\rho_M = 2.64$ g/cm$^3$

COMPARISON EXAMPLE 2

The sample (b) was used and the volume was measured by a method using Le Chatelier's specific gravity bottle according to JIS R 5201 (Article 6 of physical testing method of cement). Time required for the measurement was 18 hrs. The same amount of the sample as that in Example 2 could not be used due to the scale of Le Chatelier's specific gravity bottle, since the sample (b) was a powder. Accordingly, the measured value was converted into a value so as to give the same mass.

The measured results were as follows:
$V_M = 55.9$ cm$^3$,
$\rho_M = 2.63$ g/cm$^3$

EXAMPLES 3 AND 4

The procedure of Example 1 was repeated except that in Example 3, there was used, as a sample (c), a 100 ml messcylinder whose top was cut off; in Example 4 there was used about 100 ml of pure water as a sample (d); and butane gas was used in place of carbon dioxide gas. Since the sample (d) was a liquid, the sample (c) was used as the container thereof, and the measurement was made in a similar manner to that described in Example 2. Time required for the measurement was 10 minutes. The temperature within the sealed vessel was 25.5° C. in air at the atmospheric pressure and 24.6° C. in butane gas under a pressure of 755 mmHg.

The measured results are as follows:
Sample (c):
$V_M = 43.15$ cm$^3$,
M = 97.5230 g.
$\rho_M = 2.26$ g/cm$^3$
Sample (d):
$V_M = 100.16$ cm$^3$,
M = 100.0603 g.,
$\rho_M = 0.999$ g/cm$^3$

COMPARISON EXAMPLES 3 AND 4

The sample (c) was used in Comparison Example 3 and the sample (d) was used in Comparison Example 4. Though an attempt to measure the sample (c) in the same manner as in the sample (a) was made, it was found that the balance device had to be reconstructed to hang the sample in water. Hence, the measurement was stopped. With regard to the sample (d), only the volume was measured and read from the graduation of the mess-cylinder which was the sample (c) and used as the container.

The measured result was as follows:
Sample (d): $V_M = 100.0$ cm$^3$

EXAMPLES 5 TO 8

As the solid balance, there was used lever balance system directreading balance (H-101 type manufactured by E. Mettler Co.; weighing capacity: 160 g., reciprocal sensitivity: 1 mg., minimum scale: 0.1 mg.; weight density: 8.4 g/cm$^3$). The procedure of Example 1 was repeated except that pure magnesium block [the same as the sample (a)] as a sample (e), brass block (weight) of about 50 g. as a sample (f), glass sphere having an outer diameter of about 24 mm as sample (g) and air-filled hollow glass sphere having an outer diameter of about 31 mm were used in Examples 5 to 8, respectively. Time required for the measurement was 14 minutes.

However, since the balance was a lever balance, the zero of the solid balance was shifted by the change of gas density. Hence, the shifted rate $\Delta G_o$ was measured and the equations (30), (38) and (40) were used as the calculation equations.

The measured results were as follows:
Sample (e):
$V_M = 89.76$ cm$^3$,

M=156.1955 g.
$\rho_M$=1.740 g/cm³
Sample (f):
$V_M$=5.95 cm³,
M=49.9994 g.
$\rho_M$=8.40 g/cm³
Sample (g):
$V_M$=7.77 cm³,
M=17.3550 g.
$\rho_M$=2.23 g/cm³
Sample (h):
$V_M$=15.50 cm³,
M=19.2774 g.
$\rho_M$=1.24 g/cm³

COMPARISON EXAMPLES 5 TO 8

Samples corresponding to Example 5 to 8 were used in Comparison Examples 5 to 8, respectively. The measurement was made in a similar manner to that described in Comparison Example 1. Time required for the measurement was 180 minutes in total. The sample (e) was the same as the sample (a).

The measured results were as follows:
Sample (e):
$V_M$=87.77 cm³,
M=156.1968 g.
$\rho_M$=1.740 g/cm³
Sample (f):
$V_M$=5.91 cm³,
M=49.9993 g.
$\rho_M$=8.46 g/cm³
Sample (g):
$V_M$=7.80 cm³,
M=17.3550 g.
$\rho_M$=2.23 g/cm³
Sample (h):
$V_M$=15.46 cm³,
M=19.2774 g.
$\rho_M$=1.25 g/cm³

EXAMPLE 9

The sample (h) used in Example 8 was a hollow glass sphere filled with air. In Example 9, the volume of air within the hollow glass sphere of the sample (h) was measured.

The sample (h) and the sample (g) were prepared from the same material and the density thereof was 2.23 g/cm³. The mass of the glass part of the sample (h) was 19.2673 g. Therefore, the volume of the glass part of the hollow glass sphere used as the container was 19.2673÷2.33=8.63 cm³. Since the entire volume of the sample (h) measured in Example 8 was 15.50 cm³, the volume of air within the hollow glass sphere was 15.50−8.64=6.78 cm³.

The density of sealed air was $$(19.2774-19.2673)\div 0.78=0.00147 \text{ g/cm}^3$$

As is clear from the above description, the present invention provides a volume measuring method and a volume measuring apparatus which allow measurement to be rapidly conducted with high accuracy. A gas density balance or a gas specific gravity balance and a solid balance are used and hence, the operation for the measurement is simple. Since the measurement is made in gases, the samples may be any of solids, liquids and gases. The method of the invention can be applied to any of the solids, the liquids and the gases, so long as the volume of the sample can be kept constant in the atmosphere.

Further, true mass under vacuum can be easily determined by the method of the present invention. Usually, the true mass can be hardly determined and hence, apparent mass as measured in the atmosphere is used as mass.

In conventional weighing method at present, either the correction of buoyancy is made by a known simple approximate equation, or the measurement is made by using vacuum balance, when high accuracy is required.

Further, the volume as well as the mass are simultaneously determined in the present invention and hence, the density which is an important physical value, can be immediately calculated with high accuracy.

We claim:

1. A method for measuring the volume of a sample, comprising the steps of:
   measuring the weight of the sample by means of a balance within a sealed vessel containing a first gas;
   then replacing the first gas in the vessel with a second gas having a density different from that of the first gas;
   measuring the weight of the sample by means of the balance within the sealed vessel containing the second gas to determine a change of weight of the sample corresponding to the change of the gas; and
   calculating the volume of the sample according to Archimedis' principle as a function of the value of the difference between the density of the first gas and the second gas and the value of the change of weight of the sample corresponding to the change of the gas.

2. The method of claim 1, wherein the density of at least one of said gases is measured by means of a gas density balance.

3. The method of claim 1, wherein the density of at least one of said gases is measured by means of a gas specific gravity balance.

4. The method of claim 1, wherein the first gas and the second gas are selected from the group consisting of air, carbon dioxide, propane, butane, sulfur hexafluoride, hydrogen, inert gases of Group O of the Periodic Table, nitrogen, oxygen and fluorinated chlorinated hydrocarbons, under condition that the first gas is different from the second gas.

5. The method of claim 1, wherein the first gas is air, and the second gas is carbon dioxide gas.

6. The method of claim 1, wherein the first gas is carbon dioxide gas and the second gas is air.

* * * * *